US005816509A

United States Patent [19]

Ahn et al.

[11] Patent Number: 5,816,509

[45] Date of Patent: Oct. 6, 1998

[54] APPARATUS FOR CONTINUOUSLY SUPPLYING FINE POWDER IN MINUTE AND QUANTITATIVE AMOUNTS

[75] Inventors: Byung-Kil Ahn; Wang-Kyu Choi; Won-Jin Oh, all of Daejeon-Si, Rep. of Korea

[73] Assignee: Korea Atomic Energy Research Institute, Daejeon-Si, Rep. of Korea

[21] Appl. No.: 970,079

[22] Filed: Nov. 13, 1997

[30] Foreign Application Priority Data

Aug. 26, 1997 [KR] Rep. of Korea .................. 1997 40926

[51] Int. Cl.[6] .................................................... B02C 19/06

[52] U.S. Cl. ................................ 241/39; 241/47; 241/58; 241/63

[58] Field of Search .............................. 241/1, 5, 39, 47, 241/58, 63, 64, DIG. 14, 40; 239/340, 344; 406/114

[56] References Cited

U.S. PATENT DOCUMENTS

| | | | |
|---|---|---|---|
| 2,390,678 | 12/1945 | Andrews | 241/5 |
| 2,656,308 | 10/1953 | Pettyjohn | 241/39 X |
| 3,869,090 | 3/1975 | Roussel et al. | 241/5 |
| 3,876,156 | 4/1975 | Muschelknautz et al. | 241/5 |
| 3,951,462 | 4/1976 | De Francisci | 302/56 |
| 4,265,572 | 5/1981 | Bourdois et al. | 406/114 |
| 4,391,411 | 7/1983 | Colburn | 241/1 |
| 4,705,221 | 11/1987 | Isayama et al. | 241/27 |
| 4,859,121 | 8/1989 | Deysson et al. | 406/114 |
| 5,271,695 | 12/1993 | Bischof et al. | 406/114 |
| 5,346,141 | 9/1994 | Kim et al. | 241/5 |
| 5,636,921 | 6/1997 | Murata et al. | 366/105 |

*Primary Examiner*—John M. Husar
*Attorney, Agent, or Firm*—Nikaido, Marmelstein, Murray & Oram LLP

[57] ABSTRACT

An apparatus for continuously supplying fine particles (powder) in minute and quantitative amounts in a dispersed manner, is disclosed. An orifice throat 5 is formed in an orifice tube, and a powder carrying tube 7 is connected to the orifice throat. A powder suction tube 9 having a shape of an inverted funnel extends to the powder carrying tube, and a plurality of holes 16 are formed on a tapered circumferential surface of the powder suction tube 9. A powder storing container 10 closely contactedly receives the powder suction tube 9 in an air-tight state, but allows the powder suction tube to perform straight movements. A carrying system raises the powder storing container at a constant velocity, and a compressed gas injecting channel is connected to an upper portion of the powder storing container. A gas spouting nozzle 4 is connected to a compressed gas source, for spouting a compressed gas into the orifice throat 5 so as to form the powder into an aerosol. The fluidizing of the powder can be adjusted by adjusting the flow rate of the compressed gas (flowing through said compressed gas injecting channel 8), and the fluidizing of the powder is maintained at a constant level by raising the powder storing container at a constant velocity, so as to supply the powder quantitatively and continuously in a dispersed manner by forming an aerosol.

1 Claim, 2 Drawing Sheets

APPARATUS FOR CONTINUOUSLY SUPPLYING FINE POWDER IN MINUTE AND QUANTITATIVE AMOUNTS

BACKGROUND OF THE INVENTION

1. Field of the Invention

The present invention relates to an apparatus for continuously supplying fine particles (to be called powder) in minute and quantitative amounts.

2. Description of the Prior Art

In a polymer synthesis and in a plastic processing, there is required a process in which dried powders of filling stuffs, weight agents, plasticizers, stabilizers or the like are supplied in minute and quantitative amounts so as to improve the properties of the final products.

Further, in a ceramic synthesis by using a powder aerosol and in manufacturing pigments, pigment products and aromatic substances, there is required a process of continuously supplying powders in a quantitative manner.

In these manufacturing fields, the minute and quantitative supply of dried powders affects the properties of the final products, and therefore, the process is very important.

Further, when testing the performance of an air purifier, a dispersed powder is supplied during the operation of the air purifier.

Generally, in a powder, there act the electrostatic forces between the fine particles, and therefore, a tiny and quantitative supply of the powder is very difficult.

Among the conventional powder supplying methods, the physical classifying method is constituted such that a powder is spread on a rotary disc, and a certain amount of the powder is pushed by means of an installed blade during the rotation of the disc. This method shows a large error in supplying the powder, and the powder is supplied in agglomerate phase.

Another method is constituted such that a powder filled in a cylindrical container is slowly pushed up by means of a piston, and at the same time, a compressed air is spouted to the upper surface powder container. In this method, however, the powder is compressed during the push-up of the piston, and a density difference is formed within the powder. Therefore, a uniform concentration feeding is failed, and the compressed powder attaches on the wall of the cylindrical container, with the result that clogging occurs.

SUMMARY OF THE INVENTION

The present invention is intended to overcome the above described disadvantages of the conventional techniques.

Therefore it is an object of the present invention to provide an apparatus for continuously supplying fine particles in minute and quantitative amounts, in which the conventional problems are solved.

In achieving the above object, the apparatus according to the present invention includes: an orifice tube; a powder carrying tube connected to an orifice throat of the orifice tube; a powder suction tube forming a part of the powder carrying tube and having fluidizing holes; and a powder container carrying part.

If a compressed gas is passed through the orifice tube, the gas velocity becomes faster at the orifice throat of the orifice tube based on the Bernoulli's principle, with the result that its pressure becomes low.

Accordingly, the pressure becomes low within the powder carrying tube which is connected to the orifice throat of the orifice tube.

In order to compensate the lowered pressure, a compressed gas enters into a powder container from an air inlet of the upper portion of the powder container through the fluidizing holes of the powder suction tube. Consequently, the compressed air fluidizes the powder down to a certain depth under the surface. Therefore, the powder and the air are mixed together into an aerosol, and flow through a powder injecting channel of the orifice tube.

The fluidizing region of the powder can be controlled by adjusting the flow rate of the compressed air which enters into the orifice and the ascending rate of the powder container. Therefore, the powder ascending velocity within the powder container can be controlled, so that the supply of the powder can be accurately adjusted. Therefore, a minute quantitative and continuous supply of the powder in a dispersed manner is possible.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
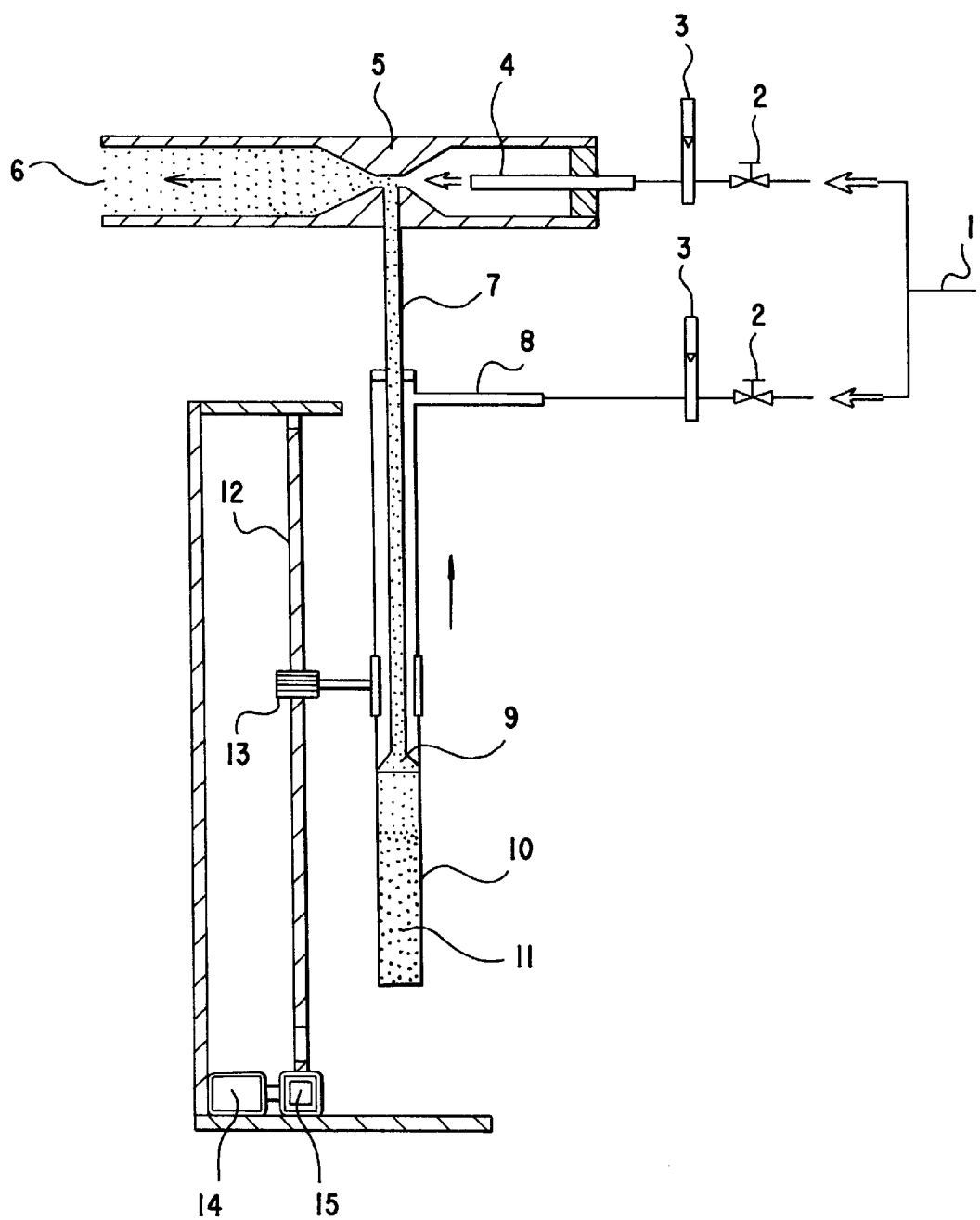
FIG. 1 is a longitudinal sectional view showing the overall constitution of the apparatus according to the present invention.
Figure 2A:
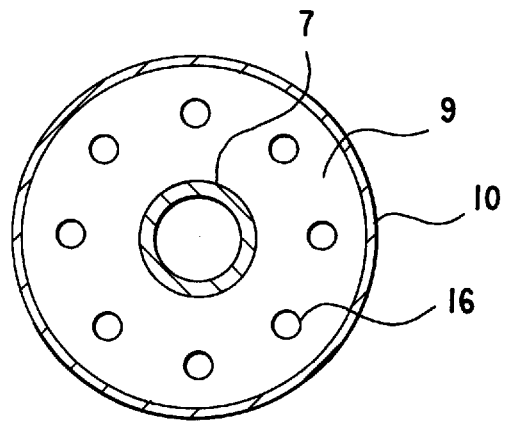
FIG. 2 is a conceptional view showing the fluidizing principle and the fluidizing holes of the apparatus of FIG. 1.
Figure 2B:
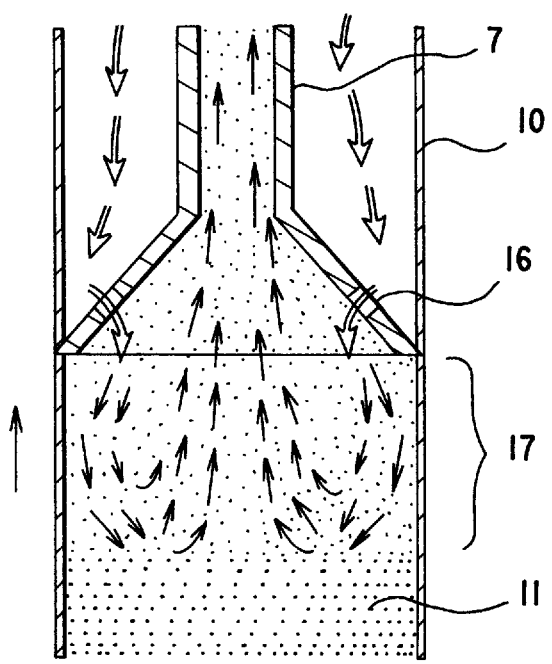

FIG. 1 is a longitudinal sectional view showing the overall constitution of the apparatus according to the present invention. FIG. 2 is a conceptional view showing the fluidizing principle and the fluidizing holes of the apparatus of FIG. 1. In short, the powder is fluidized by the fluidizing holes of a powder suction tube, and the fluidized powder flows into a powder carrying tube.

Referring to FIGS. 1 and 2, a compressed gas 1 consisting of air, N2, Ar or CO2 is spouted through a flow rate adjusting valve 2 and a flow meter 3 into a nozzle 4 toward an orifice throat 5 of FIG. 1.

The spouting pressure may be different depending on the powder density, but the fluidizing occurs smoothly at a pressure of 0.5–5 Kgf/cm2.

Owing to the spouting of the compressed gas, the velocity increases at the orifice throat 5, and the pressure is lowered based on the Bernoulli's principle, with the result that the pressure within a powder carrying tube 7 connected to the neck portion is lowered.

The inside diameter of the powder carrying tube 7 should be preferably ½–1/10 of that of a powder injecting channel 6. The powder carrying tube and a powder container may take any form, but a circular tube should be preferable for the sake of the manufacturing convenience.

A powder suction tube 9 which is connected to the powder carrying tube is closely contacted to the inside of a powder storage container 10. The powder suction tube 9 is installed in an air-tight manner, but is capable of performing straight movements. It has a shape of an inverted funnel, and includes a plurality of holes on a tapered face so as to induce fluidizing of the powder.

The angle of the tapered portion of the inverted funnel should be preferably 10–85 degrees relative to the vertical line.

In order to be recovered from the lowered pressure of the interior of the powder container, a compressed gas enters into the powder container from a compressed gas injecting channel 8 of the upper portion of the powder container through the fluidizing holes 16 of the powder suction tube at a fast velocity. Thus the lowered pressure is restored.

Consequently, the compressed air fluidizes the powder 11 down to a certain depth under the surface, i.e., to a fluidizing region 17. Therefore, the powder and the air are mixed together into an aerosol 19, and flow through a powder injecting channel 6 of FIG. 1.

These series of the procedures are reinforced in the following manner. That is, the carrying system which includes carrying screws 12 and 13, a velocity adjusting motor 14 and a reducer 15 is utilized, so that the powder container can be raised at a certain velocity, thereby making it possible to maintain the fluidizing region and the continuous supply of the powder.

According to the present invention as described above, the fluidizing phenomenon is utilized. Therefore, when the powder is pushed up, the formation of density differences, the clogging and the supply of the powder in the agglomerated state are eliminated. Thus the powder can be supplied in a dispersed state with a uniform concentration continuously.

Further, the powder suction tube is closely contacted to the inside wall of the powder container so as to maintain an air-tight state. Therefore, after the supply of the powder, there is no adhered residual powder on the inside wall of the powder container. Thus the expensive raw material can be used without loss, thereby realizing an economy.

Further, since an agglomeration and clogging do not occur in the powder owing to the fluidizing phenomenon, a uniform reaction can be realized, thereby improving the quality of the final product.

Further, during the manufacturing process, if the reaction atmosphere needs to be adjusted, the compressed gas which is used for fluidizing of the powder can be turned to the purpose of adjusting the reaction atmosphere. Therefore, the reaction atmosphere can be easily adjusted.

Therefore, the apparatus for continuously supplying fine particles (powder) in minute and quantitative amounts according to the present invention can be usefully and economically applied to manufacturing and processing chemicals, to a ceramic synthesizing process and to test an air purifying apparatus.

What is claimed is:

1. An apparatus for continuously supplying fine powder particles in minute and quantitative amounts in a dispersed manner, comprising:

an orifice throat formed in an orifice tube;

a powder carrying tube connected to said orifice throat;

a powder suction tube having a shape of an inverted funnel and extending to said powder carrying tube;

a plurality of holes formed on a tapered circumferential surface of said powder suction tube;

a powder storing container closely contactedly receiving said powder suction tube in an air-tight state, but allowing said powder suction tube to perform straight movements;

a carrying system for raising said powder storing container at a constant velocity;

a compressed gas injecting channel connected to an upper portion of said powder storing container, for supplying a compressed gas so as to fluidize the powder;

a gas spouting nozzle connected to a compressed gas source, for spouting a compressed gas into said orifice throat so as to form the powder into an aerosol;

the fluidizing of the powder being adjusted by adjusting a flow rate of the compressed gas (flowing through said compressed gas injecting channel); and the fluidizing of the powder being maintained at a constant level by raising said powder storing container at a constant velocity, so as to supply the powder quantitatively and continuously in a dispersed manner by forming an aerosol.

* * * * *